April 8, 1930.　　　E. H. LICHTENBERG　　　1,753,831
CONCRETE MIXER
Filed June 9, 1927
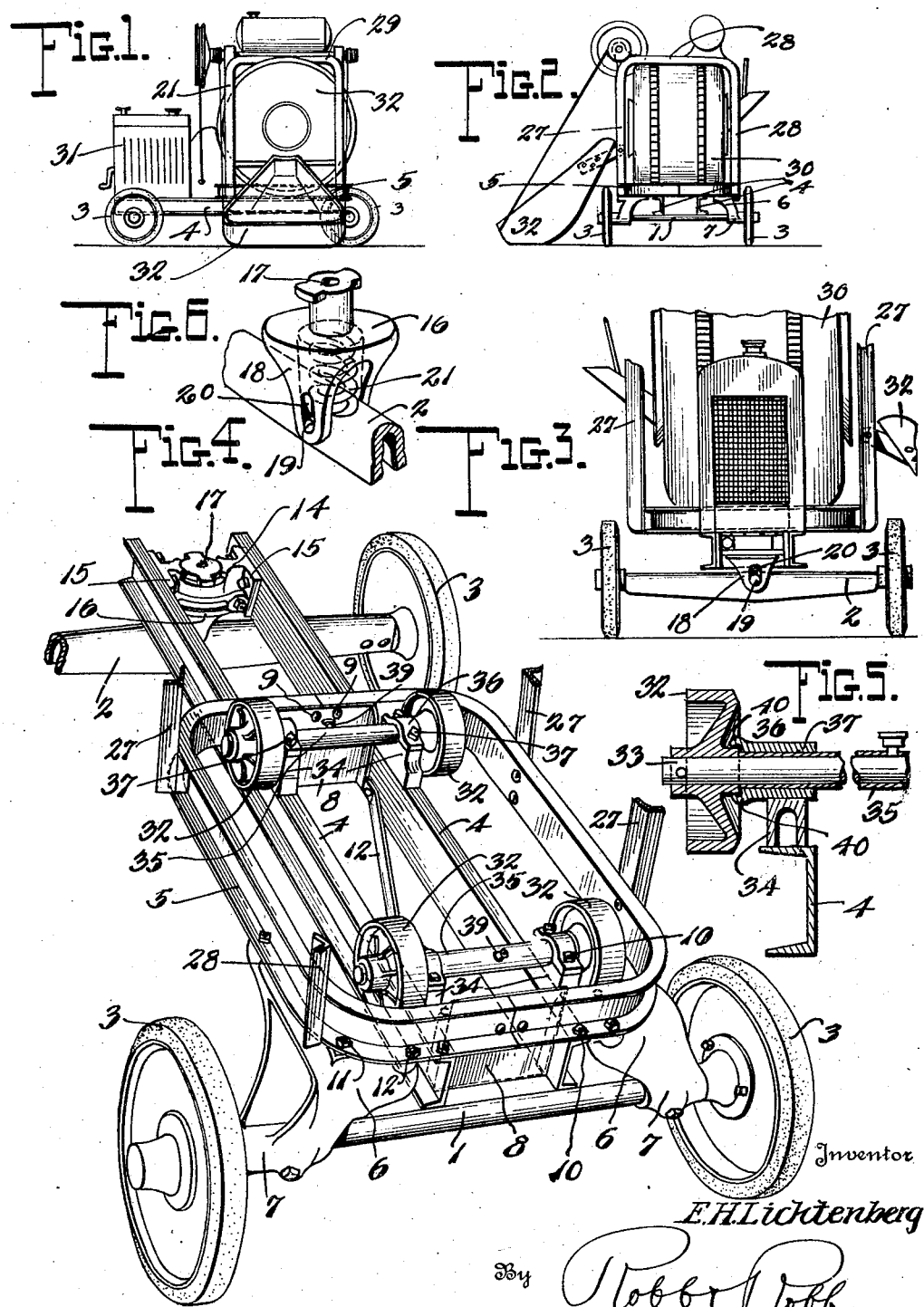

Patented Apr. 8, 1930

1,753,831

UNITED STATES PATENT OFFICE

ERICH H. LICHTENBERG, OF MILWAUKEE, WISCONSIN, ASSIGNOR TO KOEHRING COMPANY, OF MILWAUKEE, WISCONSIN, A CORPORATION

CONCRETE MIXER

Application filed June 9, 1927. Serial No. 197,593.

This invention relates to improvements in carriages for concrete mixing machines, and the primary object is the effective mounting of such mechanism on a carriage or truck adapted for ready location in relatively small areas and for turning on short radius.

With this and other objects in view, as will in part hereinafter become apparent and in part be stated, the invention includes a mounting characterized by a relatively low center of gravity and location for distributing the greater part of the load stresses directly on the rear axle. The invention also comprises details of construction lending sturdiness, durability and involving simplicity, portability and compactness of parts and assuring ease of transportation and positioning.

In the accompanying drawing:—

Figure 1 is a view in side elevation of an apparatus embodying the features of the present invention.

Figure 2 is a rear end view thereof.

Figure 3 is a view in front elevation thereof, parts being shown on an enlarged scale.

Figure 4 is a perspective view of the carriage or truck with the operating mechanism omitted and parts broken away.

Figure 5 is a fragmentary axial section through one of the drum supporting rollers, the shaft being seen in elevation.

Figure 6 is a detailed view of the turntable structure of the device.

Referring to the drawing by numerals, 1 indicates a rear axle and 2 a front axle, each supported by the usual carrier wheels 3, 3 which may be of any preferred and serviceable type. The supporting framework of the structure is mounted on the axles 1 and 2 and consists of a pair of channel beams or other appropriate commercial shapes 4, 4 suspended at their rear ends from a superimposed frame 5 mounted on brackets 6, 6 at its rear end, said brackets in turn extending to and resting upon the axle 1 adjacent the respective wheels 3 and being connected thereto by sleeves 7, 7 surrounding the axle. The frame 5 is preferably made up of a pair of channel beams or other appropriate commercial shapes bent to form yokes with their ends juxtaposed to produce practically a rectangular framing comprising frame 5. The ends of the commercial shapes forming the frame 5 are preferably connected by plates 8, 8 riveted or otherwise secured at 9, 9 to the webs of the respective members of the frame 5. The forward end of the frame 5 rests on and is supported by the beams 4, and the frame is secured to said beams by bolts or like attaching means 10, 10 extending through the contacting flanges of the channel members of frame 5 and of the beams 4. The brackets 6 are also anchored to the frame 5 by bolts or like securing means 11, 11 extending through appropriate parts of the brackets 6 and through the lower flange of the frame 5. Each of the brackets 6 is preferably a casting but may be otherwise formed if preferable. An inclined stay 13 connects the rear portion of one of the beams 4 with an intermediate portion of the other beam at substantially the forward end of the frame 5, for increased rigidity. The beams 4 are spaced apart laterally only a comparatively short distance and represent a relatively narrow forward portion of framework as compared with the relatively wide frame 5, and between the forward ends of beams 4 is arranged the bearing plate 14 having bracket flanges 15, 15 facing the respective beams 4 and bolted or otherwise anchored thereto. Beneath the plate 14 is the fifth wheel or turntable 16 having the pivot shaft 17 extending through the plate 14 and pivotally retaining the turntable 16 in operative position. As clearly seen in Figure 3, the fifth wheel or turntable 16 has a pair of spaced downwardly turned flanges 18 extending on opposite sides of the axle 2 and connected thereto by a pivot pin 19. The flanges 18 are slotted at 20 to permit the passage of the pin or bolt 19 and to allow vertical play of the flanges 18 relative to the axle 2 or play of the axle relative to said flanges. To permit such movement, a resilient support such as spring 21 is arranged between the axle and the main portion of the fifth wheel 16, enclosed by flanges 18 so that the axle 2 may turn in horizontal planes on its pivot 17 and may swing vertically on its pivot 19, as well as have a slight amount of free bodily vertical movement incident to play of the pin 19 in slots 20.

A bail-like standard 22 has its ends connected to the sides of the framing near the front end thereof, and upstands therefrom to provide supports for superimposed mechanism. To the rear portion of the frame 5 is fixed a similar bail-like standard 28 for similar purposes. The standards 28 are also preferably connected by appropriate cross pieces 29 at the place of their arches or upper extremities. Arranged within the framing produced by the parts 27, 28 and 29 is a mixing drum 30 of conventional form geared to be driven by an engine 31, by a well known type of gearing. Also a skip 32 is pivoted to a pair of uprights made of one of the bars of a standard 27 and one of the bars of the standard 28 in position to swing from the at rest position of Figures 1 and 2 to a discharging position for delivering the load into the mixing drum 30 in a well known manner.

The engine 31 is mounted on and fixed to the forward portion of the beams 4, that is, the portion forward of the framing 5, and the engine is preferably relatively narrow in its external outline, including its cooling system, so that the axle 2 is free to pivot horizontally to a maximum extent, the narrow form of the forward portion of the frame of the truck allowing the forward wheels 3 to effect a very short turning radius.

The mixing drum 30 rests on supporting rollers 32, 32 arranged in pairs, and the rollers of each pair are carried by a shaft 33 journalled in bearing boxes 34, 34 fixed to and upstanding from the upper flanges of the beams 4. Each shaft 33 is preferably surrounded by a bearing bushing 35 which possesses the peculiarity of enclosing the entire shaft from one roller 32 to the other roller 32 and extending throughout the bearing sleeve of the respective bearing block 34. Each bearing block 34 is provided with a bearing cap 36 secured in position on its respective bearing block by cap screws or other appropriate clamping bolts 37. The caps 36 may be drawn down to clamp the respective ends of the sleeves 35 since the relative motion occurs between the shaft or axle 33 and the sleeve 35 in each instance. A grease cup 39 preferably communicates through each bearing sleeve 35 for delivering lubricant to the respective axle 33. Each bearing box 34 and its cap 36 is preferably flanged at 40 to provide a dust-guard for the adjacent end of the respective roller to protect the relatively moving parts against access of foreign substances.

Having thus described my invention, what I claim as new and desire to secure by Letters Patent of the United States, is:—

1. In apparatus of the class described, the combination, with a relatively narrow subframe, of a relatively wide auxiliary frame disposed upon said sub-frame adjacent one end thereof, and extending laterally beyond opposite sides of the sub-frame, a mixing machine mounted upon said end of the subframe and about which the auxiliary frame extends, said auxiliary frame forming a support for the super-structure of said machine, and means rigidly securing the ends of the auxiliary frame to said subframe.

2. In apparatus of the class described, the combination of a narrow sub-frame, a prime mover mounted at one end of said sub-frame, a relatively wide auxiliary frame mounted upon the sub-frame at the opposite end from the prime mover and extending laterally from the sides of said sub-frame, means rigidly connecting the ends of the auxiliary frame to the subframe, mixing drum supporting means mounted upon the sub-frame within the confines of the auxiliary frame, a mixing drum mounted upon said supporting means, and super-structure supporting means connected to the auxiliary frame, and mixing drum charging means supported by said last named means.

3. Apparatus of the class described, comprising, in combination, a relatively narrow subframe structure, a relatively wide auxiliary frame structure immovably secured to said subframe structure adjacent one end thereof and extending laterally beyond the sides of the subframe structure, a mixing machine mounted on one of said frame structures, and superstructure for said mixing machine mounted on the auxiliary frame structure.

4. Apparatus of the class described, comprising, in combination, a relatively narrow subframe structure, a relatively wide auxiliary frame structure secured to said subframe structure adjacent one end thereof and extending laterally beyond the sides of the subframe structure, a mixing machine mounted on one of said frame structures and superstructure therefor mounted on the auxiliary frame structure, a rear wheel and axle construction secured to said auxiliary frame structure independently of the subframe structure to provide a wide, stable support therefor, and a front wheel and axle construction pivotally mounted adjacent the end of the subframe structure opposite from that end to which the auxiliary frame structure is secured.

5. Apparatus of the class described for supporting a concrete mixing machine, comprising, in combination, a relatively narrow subframe structure, a relatively wide auxiliary frame structure secured to said subframe structure adjacent one end thereof and extending laterally beyond the sides of the subframe structure, the subframe structure extending throughout the length of the auxiliary frame structure, one of said frame structures being adapted to support a concrete mixing machine, brackets secured to the auxiliary frame structure, said brackets being spaced apart a greater distance than the width of the subframe structure, a wheel and axle construction secured to the brackets independently of the subframe structure, and a second wheel and axle construction supporting the subframe structure at the end thereof disposed away from the auxiliary frame structure.

In testimony whereof I affix my signature.

ERICH H. LICHTENBERG.